United States Patent [19]

Hagen

[11] Patent Number: 5,205,169
[45] Date of Patent: Apr. 27, 1993

[54] ANGLE OF ATTACK SENSOR USING INVERTED RATIO OF PRESSURE DIFFERENTIALS

[75] Inventor: Floyd W. Hagen, Eden Prairie, Minn.

[73] Assignee: Rosemount Inc., Eden Prairie, Minn.

[21] Appl. No.: 741,955

[22] Filed: Aug. 8, 1991

[51] Int. Cl.$^5$ ............................................. G01C 21/00
[52] U.S. Cl. .................................... 73/180; 73/178 R
[58] Field of Search ..................... 73/180, 178 R, 182, 73/861.65

[56] References Cited

U.S. PATENT DOCUMENTS

| | | | |
|---|---|---|---|
| 3,318,146 | 5/1967 | De Leo et al. | 73/180 |
| 4,096,744 | 6/1978 | De Leo et al. | 73/180 |
| 4,378,696 | 4/1983 | De Leo et al. | 73/180 |
| 4,836,019 | 6/1989 | Hagen et al. | 73/180 |
| 5,025,661 | 6/1991 | McCormack | 73/180 |

*Primary Examiner*—Donald O. Woodiel
*Attorney, Agent, or Firm*—Kinney & lange

[57] ABSTRACT

An angle of attack sensor is provided with ports for sensing flow angles in desired planes based upon differential pressure at the ports when a longitudinal or reference axis of the sensor changes relative to the flow stream. Impact pressure is also measured with the same probe, or with a separate probe, and the angle of attack is calculated by subtracting the pressures at the angle sensitive ports, and dividing by the measured impact pressure ($q_{cm}$). At higher angles of attack, the denominator $q_{cm}$ approaches and passes through zero. When this quantity, $q_{cm}$, approaches zero, the angle of attack signal becomes undefined. The problems encountered as $q_{cm}$ approaches zero has been a limitation of useful angle of attack range of angle of attack sensors for many years. It has been discovered that if the angle of attack ratio, where $q_{cm}$ is the denominator, is inverted at some point when the denominator $q_{cm}$ approaches zero, the useable range of indication of angle of attack can be greatly extended. The present invention provides apparatus and method for inverting the ratio at selected values of $q_{cm}$.

10 Claims, 3 Drawing Sheets

ANGLE OF ATTACK SENSOR USING INVERTED RATIO OF PRESSURE DIFFERENTIALS

BACKGROUND OF THE INVENTION

The present invention relates to an apparatus and a method for extending the useful range of direct angle of attack measurements with non-movable sensors.

Present pressure type non-movable angle of attack sensors use a ratio of two measured or sensored pressure differentials to determine angle of attack. A hemispherical end sensor is described in U.S. Pat. No. 3,318,146. Angle of attack and angle of side slip both are calculated from the pressure signals present at five ports on the end.

Sharp tipped pitot static tubes with angle of attack sensing ports, are shown in U.S. Pat. Nos. 4,096,744 and 4,378,696. These patents show probes providing differential pressures which are used for determining angle of attack. In patent '696, a combination of differential pressure at two ports, measured pitot pressure and measured static pressure is used. In patent '744, measured pitot pressure, pressure at one of the angle of attack sensitive ports and measured impact pressure are utilized for the calculations. However, in both these probes the angle of attack measurement is based upon pressure differentials which, while having the ability to measure angle of attack reliably at most normal angles of attack, have limitations when extremely high angles are measured.

SUMMARY OF THE INVENTION

The present invention provides an apparatus and method utilizing differential pressure measurements from properly located angle sensing ports on a probe for determining angle of attack on a probe. For a wide range of angles from a reference position or zero angle, the calculation is a ratio of the measured differential pressure ($P_1 - P_2$), divided by measured impact pressure ($q_{cm}$). As angles of attack increase substantially from zero reference, the quantity $q_{cm}$, measured impact pressure, becomes approximately zero. The present invention comprises inverting the quantity or ratio used for calculation when the normal denominator is still a reliable number. The differential pressure quantity then becomes the denominator or divisor and the measured impact pressure becomes the numerator of the ratio.

The inversion of the ratio can be implemented by utilization of a comparator that will switch between the first and second ratios when the quantity or value of the measured impact pressure reaches a desired value. One switch value is when the ratio reaches a value of 1.0. Once the normal ratio is inverted, the sensed pressure signals continue to provide a usable angle of attack signal up to about ±80°.

In many sensor designs, the measured impact pressure approaches zero in the range of 65°. Selecting the switchover point for inversion of the ratio, with measured impact pressure becoming a numerator and differential pressure the denominator, at a whole number value of the measured impact pressure, ensures that the output angle of attack signal will remain reliable across a greater range.

The extension of the range of reliable angle of attack measurements using pneumatic signals is increasingly important, and has been one of the sought after goals since the development of probes such as that shown in U.S. Pat. No. 3,318,146 back in the 1960's. The present invention provides simple, reliable means of obtaining the necessary readings without complex hardware or software.

DETAILED DESCRIPTION OF THE PREFERRED EMBODIMENTS

Figure 1:
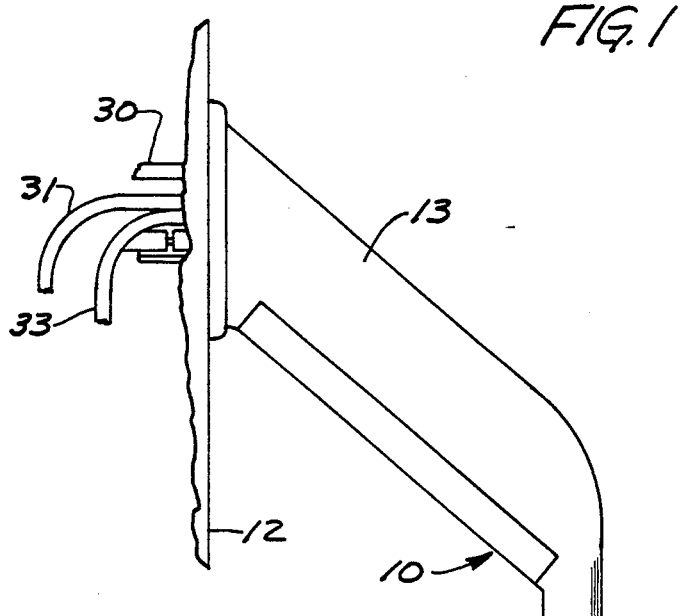
FIG. 1 is a plan view of a strut mounted air data sensing probe which has sensing ports useful for determining angle of attack in accordance with the present invention.
Figure 2:
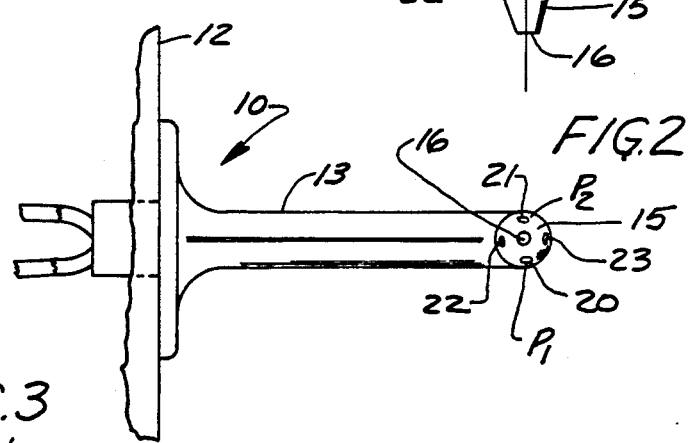
FIG. 2 is a front view of the probe of FIG. 1.
Figure 3:
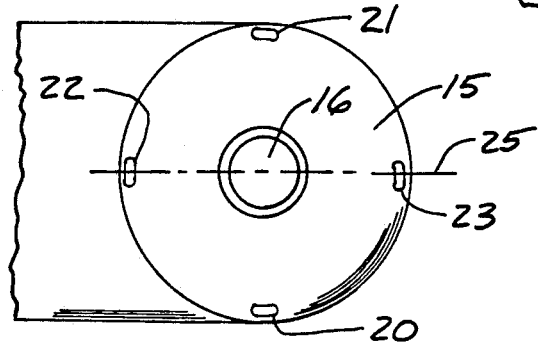
FIG. 3 is a fragmentary enlarged front view of the probe of FIG. 1.

A typical probe for sensing air data parameters is illustrated at 10, and is generally of the type described in U.S. Pat. Nos. 3,318,146 and 4,836,019. The probe shown is of the general type used for obtaining the information shown in the plots or graphs included in the drawings. However, FIG. 1 is not intended to represent that the particular ratio of strut length to tube length disclosed was utilized in the operation providing the graph results, or that the particular strut shown in FIG. 1 was the same. FIG. 1 is an illustrative example of the type of probe that can be used with the present invention.

The probe 10 includes a strut or support section 13 and a cylindrical section 14 supported by the strut. The cylindrical section 14 is a tube that has a tapered end 15, although the forward end could be a hemispherical head as shown in the sensor or probe of U.S. Pat. No. 3,318,146.

The tube 14 has a central axis that is preferably aligned with, or at a known relationship to, the axis longitudinal reference of the air vehicle. a forwardly facing port 16 is centered on the central axis, and is at the leading end. There are four other sensing ports on the end portion 15, including a first port 20 and a second port 21 that are formed with their axes lying on a common plane which passes through the longitudinal axis of the tube section 14. This plane is generally parallel to the mounting surface 12.

Third and fourth ports 22 and 23 are sometimes provided in the end portion 15 and have their axes lying on a plane passing through the longitudinal axis of the tube section 14 and perpendicular to the plane of the axes of ports 20 and 21. The axes of ports 22 and 23 lie in a plane indicated at 25 generally perpendicular to the mounting surface 12. Each of the ports, including port 16, is connected to a separate pressure carrying conduit so the pressures can be individually plumbed to desired sensors. Such conduits are shown generally at 30, 31 and 33 in FIG. 1.

In addition, the pressures sensed at the respective ports are labeled $P_1$ (port 20), $P_2$ (port 21), $P_m$ is a measured static pressure. $P_m$ can be an average of pressure sensed at ports 20 and 21 or the average of pressure sensed at ports 22 and 23, or can be a separate static pressure measured on the sensor. $P_{t'm}$ is the measured pitot pressure, measured at port 16. All of the air data sensors in the prior art patents mentioned in the background of the invention derive angle of attack using a basic ratio of two pressure differentials $(P_1-P_2)/(P_3-P_4)$ $P_3$ and $P_4$ are not labeled on the present drawings, but $P_3$ is the same as the pressure $P_{t'm}$ indicated in the present application, and $P_4$ of the prior art ratio is the same as the $P_m$ measurement of this case.

Figure 4:
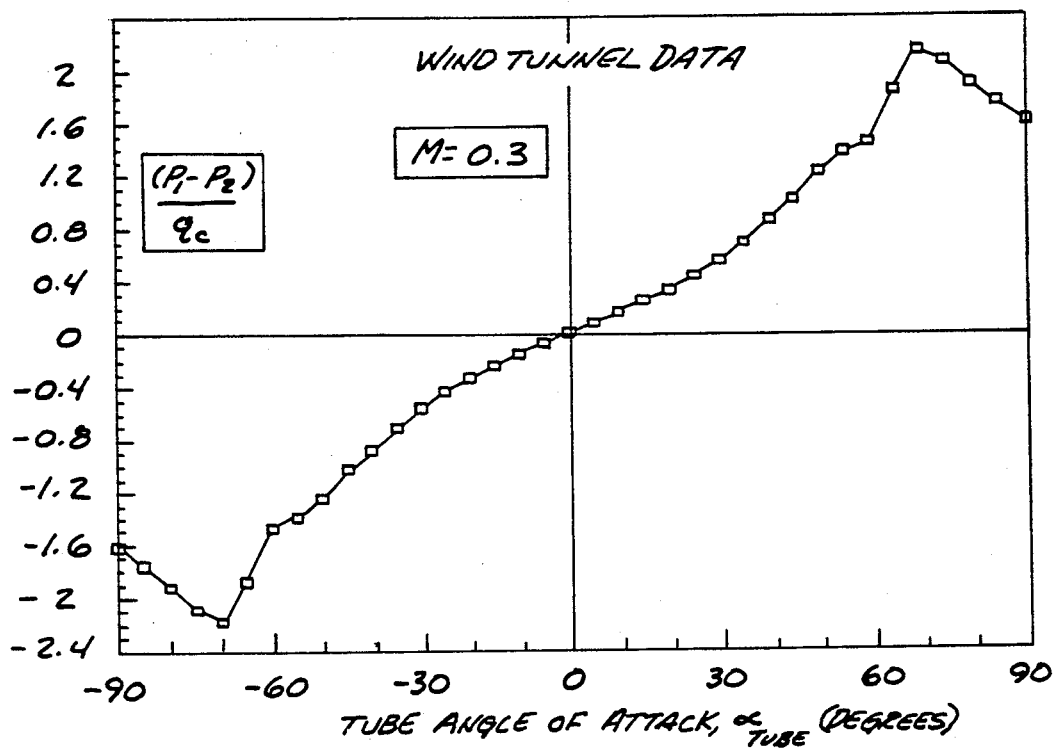
FIG. 4 is a graph containing a plot of pressure differential between two ports facing in opposite directions and having axes in the plane in which angle of attack is measured.

It is clear that $(P_1-P_2)$, the numerator in the equation or ratio, varies with angle of attack. An example shown in FIG. 4 is a typical curve when $(P_1-P_2)$ is divided by the true impact pressure $(q_c)$ as opposed to measured impact pressure $q_m = (P_{t'm}-P_m)$. True impact pressure, $q_c$ is a constant for all angles of attack at each different Mach number.

Figure 5:
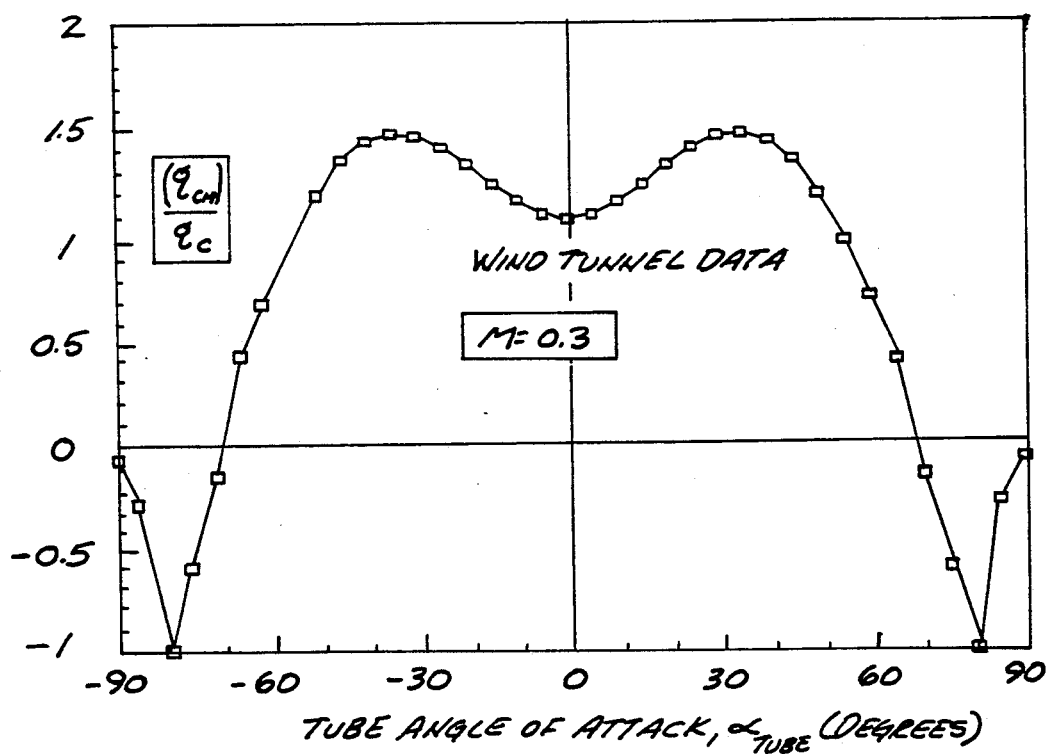
FIG. 5 is a graph containing a plot of measured impact pressure variations within the range in sensor angle of attack.

As shown in FIG. 4, the ratio $(P_1-P_2)/q_c$ shows a large sensitivity to angles of attack to about ±70°, and then levels out (becomes less sensitive) and starts to decrease as the angle of attack approaches 90°. The denominator pressure differential $(P_3-P_4)$ of the prior art equation also varies with angle of attack. In FIG. 5, a plot is made wherein the differential pressure $(P_3-P_4)$ or $(P_{t'm}-P_m)$ is labeled $q_{cm}$, or measured impact pressure. It is obtained essentially by subtracting the measured static pressure $P_m$ from the measured pitot pressure $P_{t'm}$. The plot of FIG. 5 is derived when $q_{cm}$ is divided by $q_c$, and shows a large sensitivity to angle of attack, decreasing to about $-1.0$ at plus or minus 80° of attack. The numerator pressure differential passes through zero at an angle of attack of about 65°.

While the shape of the curve shown in FIG. 5 will vary for each of the different sensors, there will be an angle of attack during operation of high performance air vehicles when the numerator $q_{cm}$ will pass through zero. When $q_{cm}$ is equal to zero, the angle of attack signal $(P_1-P_2)/q_{cm}$ becomes undefined. This limits the useful angle of attack indicating range of the sensor.

Figure 6:
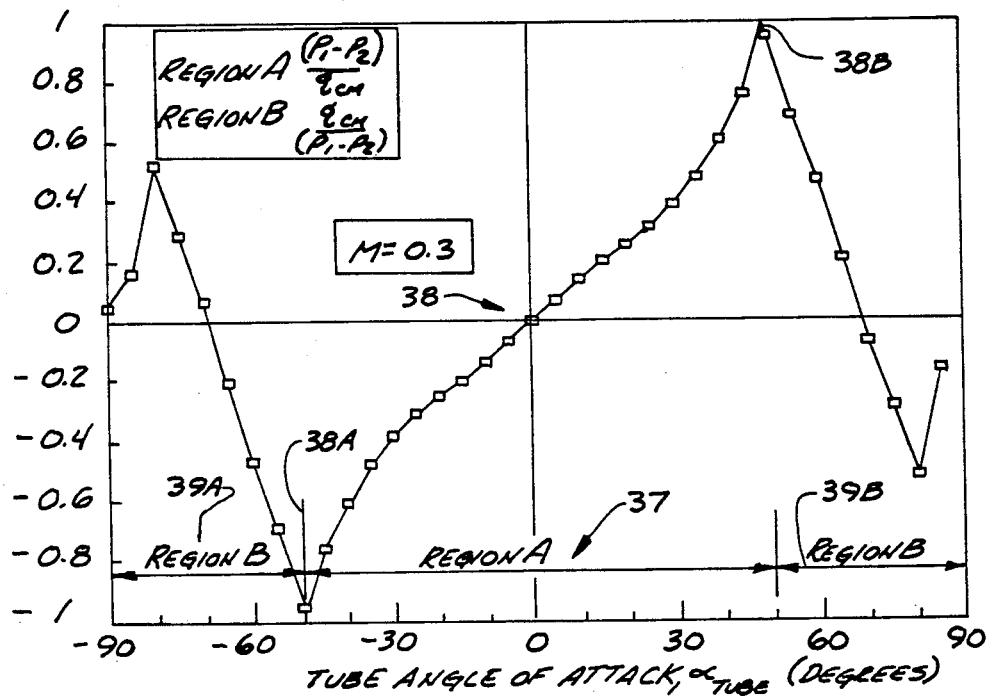
FIG. 6 is a graph containing a plot of an angle of attack signal for a probe of the type shown in FIG. 1 with the inversion function of the present invention.

However, it has been discovered that if the normal angle of attack ratio, $(P_1-P_2)/q_{cm}$, is inverted to become $q_{cm}/(P_1-P_2)$ when the denominator $q_{cm}$ approaches zero, the useful angle of attack range can be significantly extended. An example of this relationship is shown in FIG. 6. In this case, the $(P_1-P_2)/q_{cm}$ ratio is inverted when the ratio reaches the value of 1.0 (positive or negative), which occurs at an angle of attack of about ±48° for the type of probe which provided the data shown in FIG. 6 and at Mach 0.3. The inverted ratio $q_{cm}/(P_1-P_2)$ continues to provide a useable range of angle of attack signal from the change over point to about ±80° angle of attack. The normal ratio is used in region A, indicated at 37. At angles where the ratio is inverted the graph plot 38 reverses direction as at 38A and 38B, for the two regions B shown at 39A and 39B, even though the angle of attack continues to increase in the same direction (positive angles at region 38B and negative angles at region 38A). The curve can again reverse at extremely high value angles, for example 80° and above. The Mach number does affect the curve form at high angles of attack in particular, but this can be compensated in a provided air data computer.

The sensor or probe design used is symmetrical in the plane of angle of attack. The quantity $(P_1-P_2)$ is negative at negative angles of attack, but has the same absolute magnitudes as at positive angles of attack, except the sign of the pressure differential is reversed. The sign of the pressure differential $(P_1-P_2)$ can be used to determine whether the angle of attack is positive or negative when used in control functions of an air vehicle.

Figure 7:
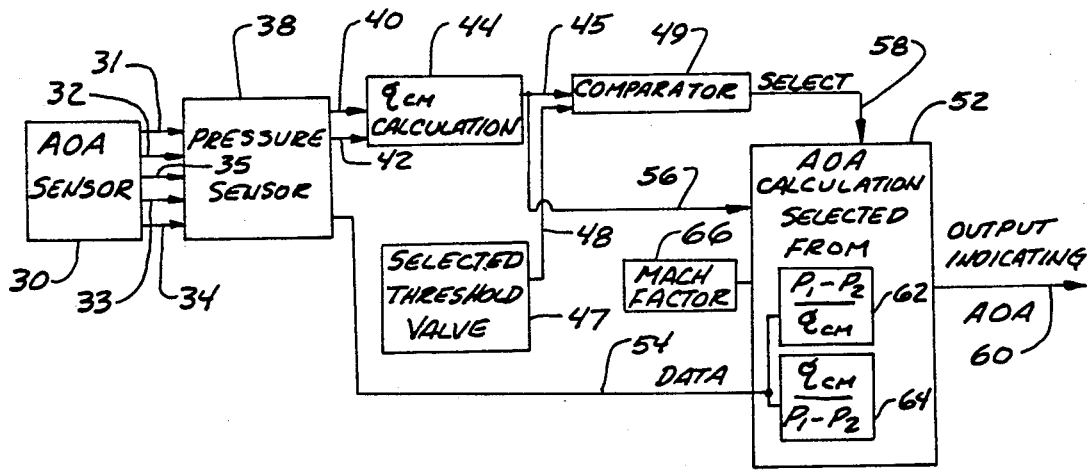
FIG. 7 is a block diagram of instrumentation used with the probe of FIG. 1 for carrying out the present invention.

Utilizing the information shown in the graphs, and, in particular, in FIG. 6, the instrumentation shown in FIG. 7 is used for carrying out the inversion function. The angle of attack sensor is indicated in this drawing at 30, and has pressure lines 31, 32, 33, 34 and 35 carrying the individual pressure signals. Pressure sensors indicated schematically at 38 are provided for either averaging back pressures to one sensor or subtracting (differential sensor) the pressures as needed for the ratio quantities. The signal from the pitot pressure port, $P_{t'm}$, and the $P_m$ signals are fed along lines 40 and 42, respectively, to a subtractor 44 that provides an output along the line 45 representing $q_{cm}$. This is a measured quantity.

Additionally, a signal generator 47 provides an electrical signal along the line 48 that is equal to the signal that is the selected switching value of the $q_{cm}$ signal along line 45. Lines carrying these signals are connected to the inputs of a comparator 49. In one state of the comparator, an air data computer 52 provides a calculation of $(P_1-P_2)/q_{cm}$ as an output. The $(P_1-P_2)$ signal is fed along a line 54 to the air data computer 52, and the $q_{cm}$ signal is provided along a line 56 to the air data computer 52.

The "select" signal (comparator output) on line 58, which may normally be low, goes to high when the signal from the $q_{cm}$ calculation circuit passes the threshold value as it moves toward zero. The change in signal on line 58 causes the computer to provide an output selected in accordance with the ratio $q_{cm}/(P_1-P_2)$. The ratios for the two calculations from the air data computer in this particular application are indicated in boxes 62 and 64, respectively. It is well known to provide a division output from air data computers. Also, a Mach number factor 66 can be provided for compensation in a well known manner. The Mach number compensation is used on existing systems.

The output indication of angle of attack on line 60 is a digital or analog signal that would be provided in accordance with the plot of the output shown in FIG. 6, and by switching the ratio when the value of $(P_1-P_2)/q_{cm}$ equals either ±1, respectively, as $q_{cm}$ is moving toward zero, reliable results are obtained.

In FIG. 6, the region from approximately $-48°$ angle of attack to $+48°$ angle of attack is utilizing the equation or ratio shown at 62 in the air data computer, and the equation or ratio shown at 64 is used between $-48°$ angle of attack and $-90°$ as well as from $+48°$ angle of attack to $+90°$ angle of attack. The threshold or switching value can represent an angle of attack of between about 35° and 55° depending on the sensor designs, and reliable signals will still be received. Thus, the threshold value used for providing the select signal could be properly scaled and compared to the actual angle of attack output on line 60 for the inversion command.

The $(P_1-P_2)/q_{cm}$ quantity is slightly sensitive to Mach number so the signal representing the ratios are normally compensated at higher angles of attack with a factor representing Mach number. The compensation factor can be obtained by wind tunnel tests and provided as compensation in the air data computer.

Usable angle of attack signals are therefore provided across a wider range of angles of attack, than previously done.

Although the present invention has been described with reference to preferred embodiments, workers skilled in the art will recognize that changes may be made in form and detail without departing from the spirit and scope of the invention.

What is claimed is:

1. An apparatus for determining angles of attack across a substantial range comprising:
   means for measuring pressures which vary as a function of angle of attack and for providing a first signal that is a function of the difference of such pressures;
   means for providing a second signal which is a function of a measured pitot pressure and a measured static pressure;
   means for determining when the second signal is at a selected value different from zero;
   means for providing a ratio indicative of angles of attack across a first portion of the substantial range substantially equal to the first signal divided by the second signal; and
   means for providing an inversion of the ratio indicative of angles of attack across a second portion of the substantial range when the means for determining indicates that the second signal is equal to the selected value.

2. The apparatus of claim 1 wherein said means for determining comprises a comparator to compare a signal dependant on the value of the second signal with a threshold reference signal.

3. The apparatus as specified in claim 1 wherein the first signal comprises a signal proportional to the difference between two selected pressures from ports having axes lying in the plane of measurement, and on opposite sides of a reference axis of measurement.

4. The apparatus as specified in claim 1 wherein the means for providing a second signal includes means to provide a signal indicating a measured pitot pressure minus a measured pressure that is a function of static pressure.

5. The apparatus as specified in claim 1 wherein the means for providing said second signal comprises means to provide a signal indicating a measured pitot pressure from a port lying along a reference axis and facing flow past the sensor, minus a signal indicating the average pressure measured at ports having central axes lying on a plane that is perpendicular to the reference plane and passes through the reference axis.

6. The apparatus of claim 1 wherein the means for providing the second signal includes means for providing the measured static pressure as a function of the average of the pressures used to provide the first signal.

7. A method for determining the angle of attack of an air vehicle across a wide range of angles measured in opposite directions from a reference axis, comprising the steps of:
   providing a signal representing a ratio of two pressure quantities which are sensitive to angle of attack wherein the ratio has a signal representing the denominator that approaches zero at certain operating angles of attack;
   providing a first output signal representing the first mentioned ratio for a first range of angles of attack;
   selecting a reference threshold signal value which indicates the value of the denominator that is other than zero; and
   providing an output signal that is based on an inversion of the first mentioned ratio when a signal indicating the value of the denominator of the first mentioned ratio is at the threshold value and is moving toward zero, thereby providing a second output signal representing said inversion of the first mentioned ratio for a second range of angles of attack.

8. The method of claim 7 wherein said denominator comprises a measured impact pressure signal derived from a measured pitot pressure minus a pressure averaged at two ports in a plane perpendicular to the plane of measurement of the angle of attack.

9. The method of claim 7 in which the threshold value is selected to represent an angle of attack of between 35° and 55°.

10. The method of claim 9 wherein the threshold value is selected to represent an angle of attack of substantially 48°.

* * * * *